(12) United States Patent
Sauerwein et al.

(10) Patent No.: US 6,213,025 B1
(45) Date of Patent: Apr. 10, 2001

(54) RAIL-GUIDED TRANSPORT SYSTEM WITH TRANSPORT VEHICLES

(75) Inventors: Richard Sauerwein, Höhenkirchen; Michael Zorn, Selters, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/029,331

(22) PCT Filed: Jul. 3, 1997

(86) PCT No.: PCT/EP97/03737

§ 371 Date: Mar. 4, 1998

§ 102(e) Date: Mar. 4, 1998

(87) PCT Pub. No.: WO98/01377

PCT Pub. Date: Jan. 15, 1998

(30) Foreign Application Priority Data

Jul. 4, 1996 (DE) .............................. 196 26 966

(51) Int. Cl.⁷ ........................................ B61B 13/04
(52) U.S. Cl. ............................. 104/121; 104/282
(58) Field of Search .................... 104/48, 281, 282, 104/283, 121

(56) References Cited

U.S. PATENT DOCUMENTS 3,913,758 * 10/1975 Faircloth et al. .................. 104/48
4,102,273 * 7/1978 Merkle et al. ..................... 104/34
4,646,629 * 3/1987 Creed et al. ....................... 104/48
5,297,483 * 3/1994 Kakida et al. .................. 104/88.01

* cited by examiner

*Primary Examiner*—S. Joseph Morano
*Assistant Examiner*—Robert J. McCarry, Jr.
(74) *Attorney, Agent, or Firm*—Ware, Fressola, Van Der Sluys & Adolphson LLP

(57) ABSTRACT

A track (rail)-guided transport system has at least one track of bearing and rail-guiding members on which is run at least one transport vehicle which has means for self-automated continuous movement along the track and to which energy is transmitted contactlessly from a primary circuit laid down along the track. The transport vehicle is designed as a carrier vehicle (2) for at least one satellite vehicle (3,9) used to transport goods and has a satellite track section for positioning and parking the satellite vehicle (3,9). The satellite track section can be brought into alignment by positioning the carrier vehicle (2) flush to satellite tracks arranged along its track, perpendicular thereto. Energy from a primary circuit laid down along the satellite tracks (7,8) is transmitted contactlessly to the satellite vehicle (3,9) equipped with means for automated locomotion. The satellite vehicle (3,9) and the carrier vehicle (2) have processor capacity and means for wireless transmission of information between them and/or with a central processing unit.

8 Claims, 3 Drawing Sheets

RAIL-GUIDED TRANSPORT SYSTEM WITH TRANSPORT VEHICLES

TECHNICAL FIELD

The invention concerns a therefor-track rail-guided transportation system with at least one travel path of carrying and track-guiding elements, with at least one transport vehicle for goods which has means for moving along the travel path and receives contactless power from a primary circuit laid along the line.

BACKGROUND OF THE INVENTION

It is already known to transmit contactless power to a vehicle. The magazine Elektric 34, 1980, H. 7 describes an arrangement for inductive power transmission to a hauling engine in a mine. This arrangement contains double lines which are laid along the ceiling of the mine tunnel. Ferrite bodies with secondary windings move between the double line; they are connected to the hauling engine and supply power to the drives and other consumers.

A device for contactless power transmission to a track-guided vehicle (PCT-GB 92/00220) is also known. A double line is secured to electrically nonconducting posts. A ferrite core that is installed on a vehicle can move along the double line and carries a secondary winding for feeding power to the vehicle. The double line receives alternating voltage in the KHz range.

Also known are high shelves for stacking goods or pallets with goods. Lifting movers travel between a receiving and discharging place and the shelves, to fill and empty the shelves with goods or pallets.

SUMMARY OF THE INVENTION

The invention is based on the problem of developing a track-guided transportation system which can be assigned transportation tasks in a simple manner, and which is also in a position to quickly carry out transportation tasks to loading and unloading areas which are far removed from each other.

This objective is achieved with a transportation system of the kind described in the beginning, in that the transport vehicle is designed as a carrier for at least one satellite vehicle for transporting goods, and has a satellite travel section for positioning and parking the satellite vehicle, that by positioning the carrier vehicle along its travel path, the travel section can be aligned flush and crosswise to these satellite travel sections, that power is transmitted in a contactless manner from a primary circuit laid along the satellite travel paths to the satellite vehicle which is equipped with means for moving it, and that at least one satellite vehicle and the carrier vehicle have processing capabilities and means for wireless telecommunication between themselves and/or a central control unit. The transportation system of the invention is able to carry out transportation tasks in a very flexible manner. Even if the carrier vehicle has only one satellite travel section, the carrier vehicle can cooperate with several satellite vehicles, whereby for example a satellite vehicle is transported to a satellite travel path, while other satellite vehicles carry out transportation tasks on satellite travel paths, or stand by loaded with goods until the carrier vehicle has brought its satellite vehicle with its goods to a selected travel section, and immediately proceeds to travel to the travel section of the other satellite vehicle in order to receive it and transport it to a new destination. The path being traveled or the target travel sections are selected by a respective transporting program, whose destination data come from a central processor which is designed e.g. as a group of input units. A significant advantage of the system of the invention can therefore be seen in that the carrier vehicle does not need to wait in a stand-by position while the satellite vehicle carries out a transportation tasks with goods. The result is a considerable increase in the transportation output, as opposed to a system in which a carrier vehicle must wait for a satellite until it has gone to receive or discharge goods and has resumed its position on the carrier vehicle.

A preferred configuration provides for at least two travel paths for the carrier vehicle in two superimposed planes with corresponding transverse satellite travel paths, and an elevator for the carrier vehicle at least at one end of the travel path.

This device can significantly increase the transportation output and the capacity of storing goods, since the carrier vehicle and satellite vehicles can be active in different planes by controlling the communication link. In this case the activity also includes the stand-by position of the carrier vehicle or satellite vehicle at a pickup or discharge place.

It is useful if the at least one satellite vehicle is designed to pick up, transport and deposit pallets. Such a configuration is particularly suited for shelves, e.g. high shelves.

The power is transmitted inductively to the carrier vehicle and to the satellite vehicle(s), particularly via the middle frequency. It is therefore useful to select a transmission device that has low inductance, even in long travel paths. It is useful if such a device includes a stationary primary circuit designed as a long line arrangement, which is connected to the middle frequency and is also arranged on the carrier vehicle along the travel path of the carrier vehicle and the satellite vehicle, and each comprises a ferrite transformer head arranged on the carrier vehicle and the satellite vehicle, and a secondary winding which encloses the ferrite core and is inductively coupled to the primary circuit. The line arrangement of the primary circuit contains an outer conductor designed as an almost closed housing, and a middle conductor located approximately in the center of the housing, in which a current of the same magnitude flows in the opposite direction, where the middle conductor is enclosed by the U-shaped ferrite core. This device allows power to be transmitted across air gaps in the centimeter range, with relatively low effort and good efficiency in the presence of low self-inductance, for the transportation of loads. The current is distributed over two outer walls, which still provides a relatively large transmission cross section, despite the skin effect.

Advantageously the U-shaped ferrite core has windings on both legs opposing the primary conductor, whose height corresponds approximately to the height of the primary conductor and is between 0.3 times and 0.5 times the total height of the U-shaped core. The height of the primary conductor in relation to the average width of the magnetic flux in the conductor area is chosen so that the transmitted power is at maximum.

For the most uniform distribution of the current, it is furthermore advantageous if the outer walls of the housing, which are opposite the middle conductor, form an arch in as wide a current-carrying area as possible. The cross sections of the outer and middle conductors and the average cross section of the magnetic flux can be configured, and the size relationships can be designed, so that a minimum of electrical dissipation takes place. A condenser is installed on the secondary winding, parallel to the load resistor; said condenser supplies the magnetization current to produce the magnetic flux density in the air gap of the ferrite core. The secondary winding is also switched in series with a condenser which compensates for the inductive voltage drop in the control inductance of the transformer head.

Communications are preferably transmitted in wireless form to the carrier and the satellite vehicles respectively via lines laid along the travel paths. Such a contactless arrangement for transmitting information enables a high transmission quality that is mostly free of electromagnetic interference. The line is preferably a coaxial cable with openings, which interacts with a patch antenna located on the carrier vehicle or on the satellite vehicle.

BRIEF DESCRIPTION OF THE DRAWINGS

The invention is explained in greater detail in the following by means of embodiments illustrated by drawings which provide further details, features and advantages, wherein.

BEST MODE FOR CARRYING OUT THE INVENTION

Figure 1:
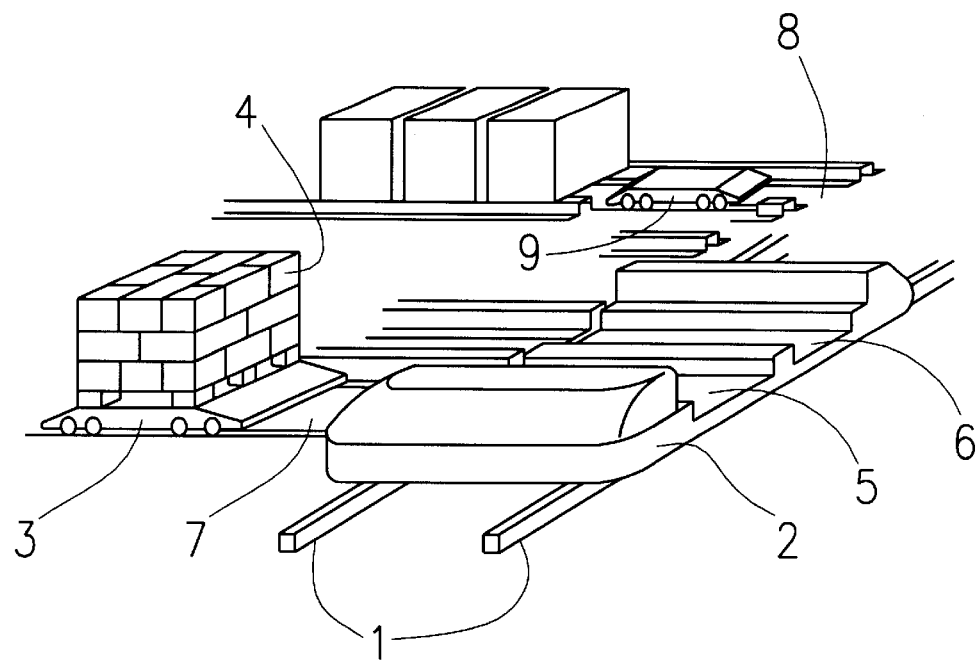
FIG. 1 is a schematically perspective view of a track-guided transportation system.

As seen in FIG. 1, a track-guided transportation system has at least one transport vehicle which can move along a travel path 1, and is designed as a carrier vehicle 2 for at least one satellite vehicle 3. The satellite vehicle 3 is intended for the receiving, transporting and discharging of goods 4. Two satellite travel sections 5, 6, which extend crosswise to the travel path 1, have carrying and track-guiding elements. The travel path 1 has carrying and guiding elements as well, which are described in more detail below. Both the carrier vehicle 2 and the satellite vehicle 3 are equipped with means for track-guiding or track-holding, and for moving.

Satellite travel paths 7, 8 are located next to the travel path 1 at the height of the satellite travel sections 5, 6. The travel sections 5, 6 can be aligned flush with the satellite travel paths 7, 8 by positioning the carrier vehicle 2 accordingly. This can take place e.g. by means of sensors on the carrier vehicle 2 or on the travel paths 5, 6. Once a travel path 5 or 6 is aligned flush with the respective travel path 7, 8, the satellite vehicle 3 can change over from the carrier vehicle 2 to the travel path 7 or 8, or conversely from a travel path 7, 8 to the carrier vehicle 2. FIG. 1 illustrates the satellite vehicle 3 and another satellite vehicle 9. The representation of two satellite vehicles should not be assumed to be limiting.

Primary circuits are laid respectively along the travel path 1 and the satellite travel paths 7, 8, and power is wirelessly transmitted from them to operate the carrier vehicle 2 and the satellite vehicles 3, 9. The travel sections 5, 6 also have such primary circuit sections to supply power to the satellite vehicles 3, 9 for changing from the carrier vehicle 2 to the travel path 7, 8 and vice versa. Both the carrier vehicle 2 and the satellite vehicles 3, 9 are equipped with circuits having processing capabilities, which enables them to record at least one control program. Furthermore the carrier vehicle 2 and the satellite vehicles 3, 9 are each equipped with a communication interface, where means are provided for the wireless transmission of information between the carrier vehicle 2 and the satellite vehicle 3, 9, and possibly to a central unit.

Figure 2:
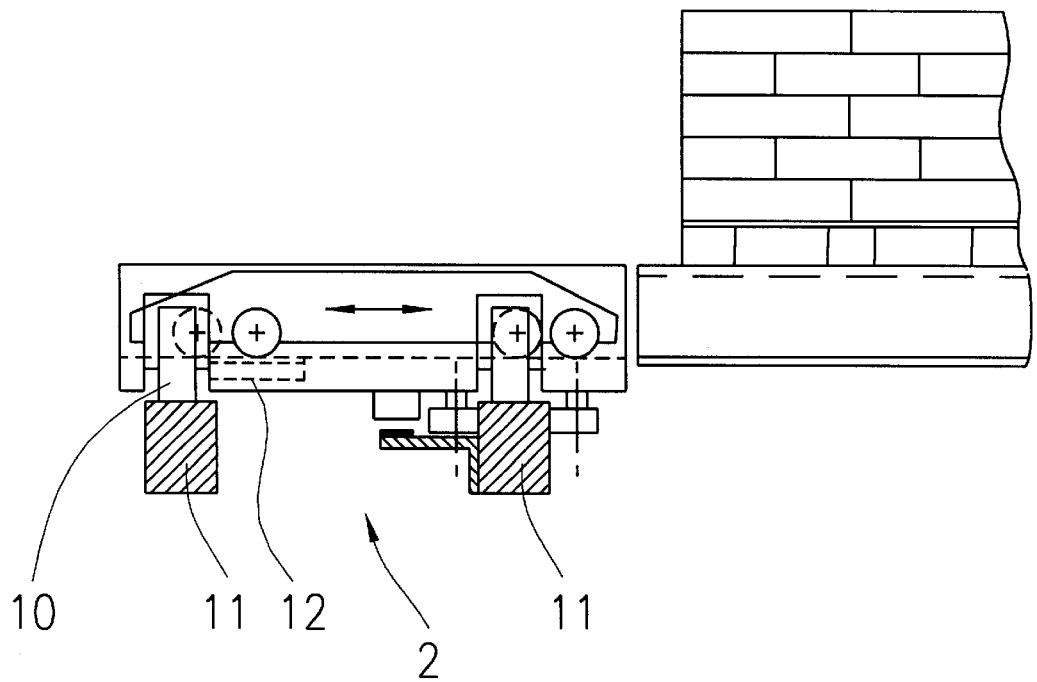
FIG. 2 is a schematic lateral view with a partial cross section of a carrier vehicle and a satellite vehicle of the transportation system illustrated in FIG. 1.

As seen in FIGS. 1 and 2, the carrier vehicle 2 comprises a driving part, which is schematically illustrated in a lower plane together with a track-guidance and sliding function. This lower plane, together with the uppermost plane, which is provided for storing the satellite vehicles 3 with their goods, forms a type of track-guided carriage. An information plane complements this carriage into a self-sufficient system. This information plane receives and sends data from and to the satellite vehicles, and from and to a fixed station which contains a transmitter and a receiver for the exchange of information, and is able to transmit and receive data as well. In addition, the carrier vehicle 2 and the satellite vehicles each have a data processor which can operate actuators and sensors. This makes it possible for example to carry out a magnetic track-guidance and gravity compensation with gap control. The adjustment of the drives takes place in accordance with the specified transportation tasks, which are issued e.g. by the fixed station. Furthermore the distance between individual carrier vehicles is controlled by the exchange of information between the vehicles, so that no collision can take place when several carrier vehicles move on the same travel path 1. The uppermost plane for storage and input and output can be set up in many ways, for example with a lifting element or a roller conveyor.

FIG. 2 shows that the carrier vehicle runs on rollers 10 and on rails 11 of the travel path 1 for example, where the drive is brought about with the help of a motor 12. The power for driving the motor 12 and other servo drives is provided by a contactless power transmission. This is made clear in FIG. 4, therefor which illustrates a rail 11 whose top side forms the track for the rollers 10. The top of the rail 11 has an L-shaped angle. The angled part covers a middle conductor 13 held by a bridge 14, which is attached to the underside of the angled section of the rail 11. The middle conductor 13 is supplied by a not illustrated middle frequency generator. The contactless transmission of power takes place by means of a transformer head 15, which has a winding W2 and is attached in the same way to the carrier vehicle 2 and to the satellite vehicles 3, 9. The core of the transformer head 15 is made of a ferrite material. The middle conductor 13, which protrudes into the transformer head 15, is part of an E-shaped arrangement that also includes the outer conductor 13a.

A slotted coaxial cable 25 is attached to the rail for transmission of the information. The coaxial cable 25 is connected to a fixed transmitting and receiving station. A patch antenna 19 is attached to the carrier vehicle 2 and is connected inside the carrier vehicle 2 to a mobile station. The transmission of the information between the fixed station, the carrier vehicle 2 and the satellite vehicles 3, 9 can also take place via radio.

Figure 4:
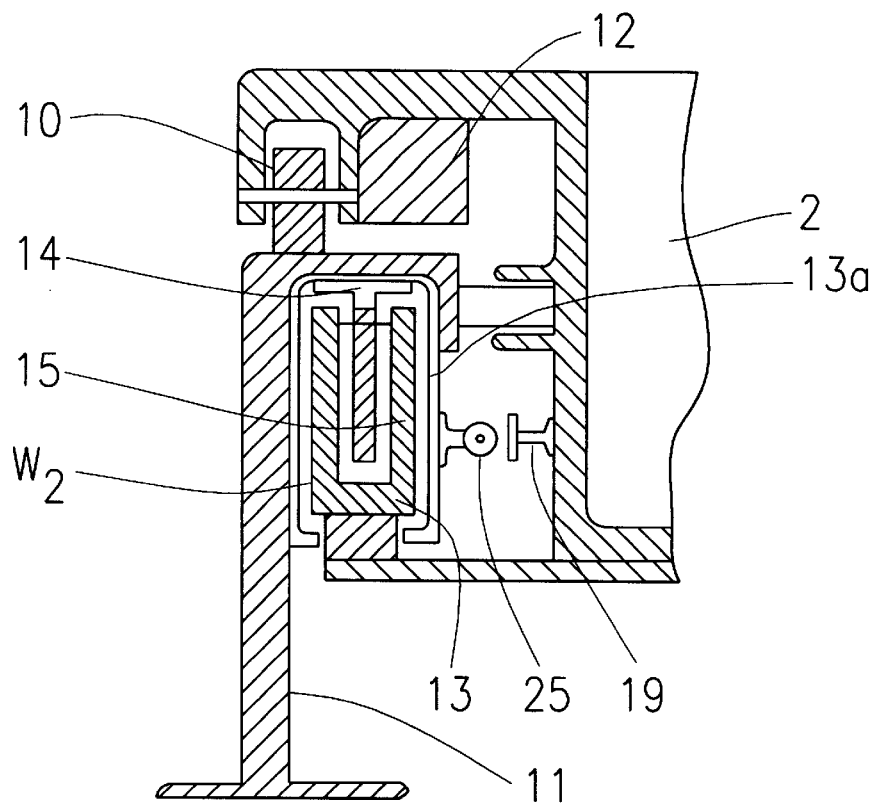
FIG. 4 is a device for the contactless transmission of power, track-guidance and information.
Figure 5:
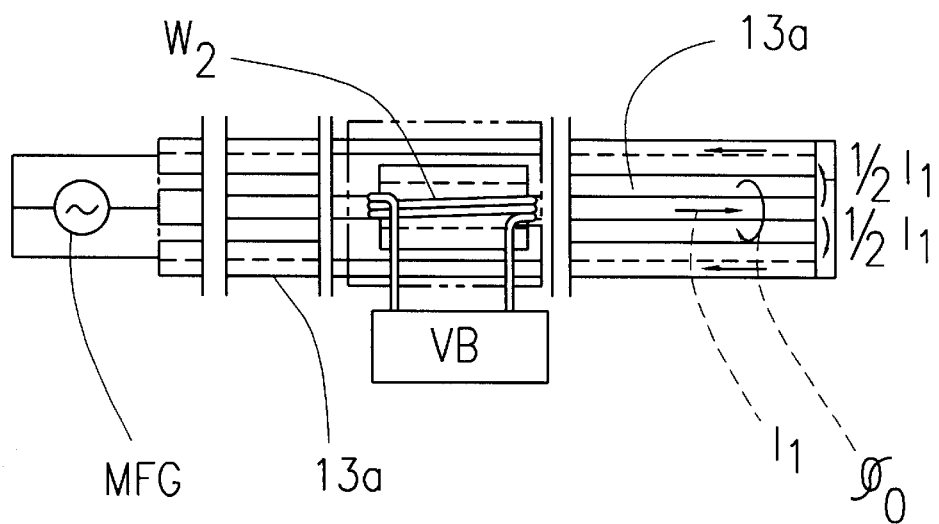
FIG. 5 is a longitudinal cross section or top view of a device for the contactless transmission of power with an open coaxial conductor.

To reduce the height of the rail, the primary element which is E-shaped towards one side, can be rotated 90° with respect to the arrangement illustrated in FIG. 4, i.e. horizontally. FIG. 5 illustrates the power transmission principle of the coaxial conductor arrangement which is open on one side.

Inside the transformer head 15, the U-shaped ferrite core envelops the middle conductor 13 and conducts the magnetic flux $\Phi$ through the secondary winding $W_2$. One end of the middle conductor 13 is supplied by a middle frequency generator so that it can conduct the current $I_1$. It is connected to the housing at the end E, which is removed from the supply source. Because of the symmetrical arrangement, the current is divided here into two partial currents $I_{1/2}$ of the same magnitude, and flows back over the housing to the middle frequency generator MFG.

Because of the current displacement taking place at high frequencies in massive conductors such as the U-shaped housing (made of aluminum for example), often also called the skin effect, the current is not uniformly divided in the housing walls, but penetrates from the inside into the housing walls in accordance with the penetration depth $\delta_E$. At 25 kHz and with aluminum, the penetration depth is about 0.5 mm. Nor is the current uniformly divided in the inner periphery of the U-profile, but flows primarily in the areas of the largest magnetic field strengths.

Figure 3:
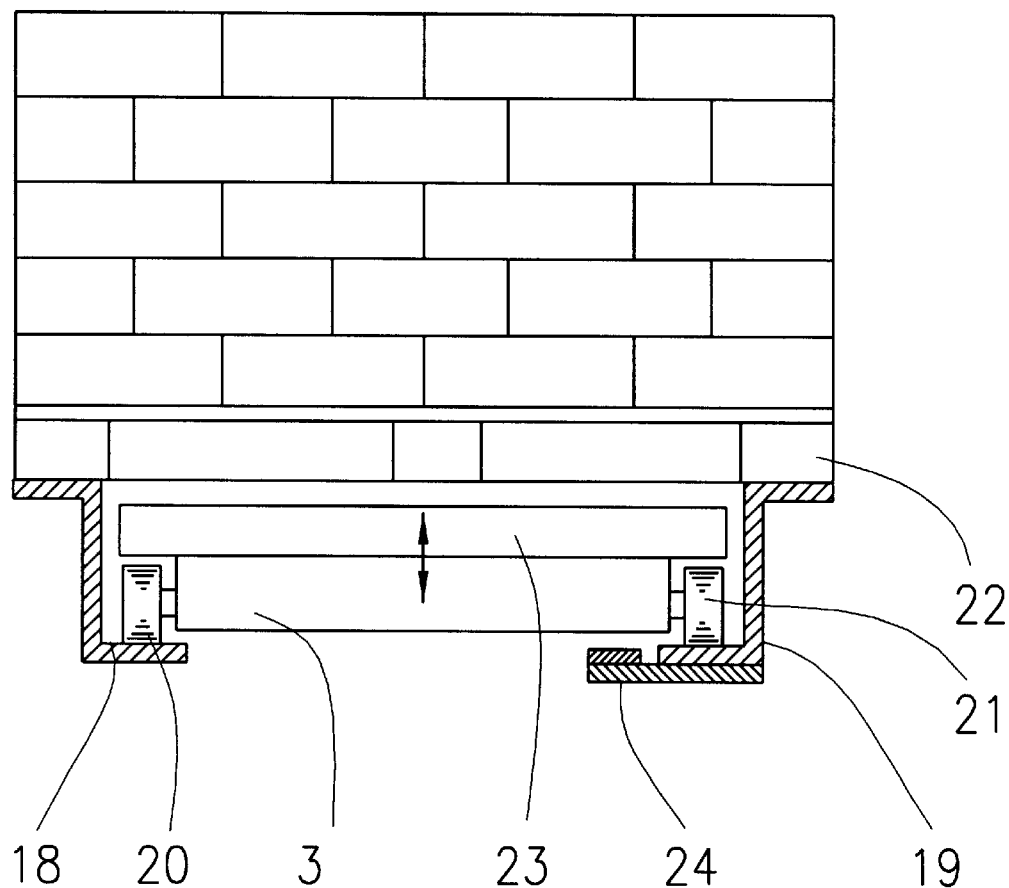
FIG. 3 is a schematic frontal cross section of a satellite vehicle of the transportation system according to FIG. 1.

FIG. 3 schematically illustrates a satellite vehicle 3 or 9 from the front. The contactless transmission of power, as explained in greater detail in FIGS. 4 and 5, is supplied to the satellite vehicle 3 from the underside. Each travel path 7, 8 contains rails 18, 19 on which the wheels 20, 21 of the satellite vehicle 3 roll. The rails 18, 19 are arranged at a distance from the ground on not illustrated supports and have Z-profiles, because they are simultaneously designed as deposit surfaces for pallets 22, which are carried by lifting platforms 23 of the satellite vehicles 3, 9. The wheels 20, 21 are supported by the lower angled ends of the Z-profiles, while the upper angled ends face the outside of the rails. The underside of the rail 19 has a carrier 24 attached to it, on which the E-shaped primary circuit with the middle conductor 13 and the outer conductor 14 are located. A not illustrated transformer head extends from the underside of the satellite vehicle 3, 9 into the primary circuit. In principle, the construction of the device for transmitting power corresponds to the one illustrated in FIGS. 4 and 5.

The satellite vehicles are able to carry out transportation tasks simultaneously with the carrier vehicle 2, i.e. satellite vehicles can transport goods on the travel paths 7, 8 while the carrier vehicle 2 is already moving satellite vehicles to other travel paths. With a lifting installation, the device illustrated in FIGS. 1–3 can be arranged in several planes. For that reason the system is particularly suited for high shelf storage. In that case the satellite vehicles can be active in several planes by means of the lifting installation, i.e. loads or goods can be transported from one plane to another with the help of carrier vehicles. Depending on the work requirement, several satellites can operate on one carrier vehicle 2. The system makes it possible to rapidly switch pallets from one storage area to another discharge area. Beyond that, the high speed of the vehicles is possible because no hindrances are caused by cables.

What is claimed is:

1. A track-guided transportation system with at least one travel path of carrying and track-guiding elements, with at least one transportation vehicle that comprises at least one self-activated powered motor providing movement along the travel path, and to which power is transmitted in a contactless manner from a primary circuit laid along the travel path, wherein:

the transport vehicle is designed as a carrier vehicle (2) for at least one satellite vehicle (3, 9) for the transportation of goods, and has a satellite travel section for positioning and parking the satellite vehicle (3, 9);

the satellite travel section can be oriented flush by positioning the carrier vehicle (2) crosswise along its travel path;

the satellite vehicle (3, 9), which comprises at least one self-activated powered motor providing movement, receives power in a contactless manner from a primary circuit laid along the satellite travel paths (7, 8); and at least one satellite vehicle (3, 9) and the carrier vehicle (2) include processing capabilities and transmitters for the wireless transmission of information between themselves and/or to a central unit which enable the satellite vehicle (3,9) and the carrier vehicle to move in a flexible manner directed by a transporting program.

2. A transportation system as claimed in claim 1, characterized in that at least two travel paths are provided for the carrier vehicle in two superimposed planes with corresponding crosswise satellite travel paths, and an elevator is provided at least at one end of the travel paths.

3. A transportation system as claimed in claim 2, characterized in that at least one satellite vehicle is designed for receiving, transporting and unloading pallets.

4. A transportation system as claimed in claim 1, characterized in that at least one satellite vehicle is designed for receiving, transporting and unloading pallets.

5. A track-guided transportation system with at least one travel path of carrying and track-guiding elements, with at least one transportation vehicle that comprises at least one self-activated powered motor providing movement along the travel path, and to which power is transmitted in a contactless manner from a primary circuit laid along the travel path, wherein:

the transport vehicle is designed as a carrier vehicle (2) for at least one satellite vehicle (3, 9) for the transportation of goods, and has a satellite travel section for positioning and parking the satellite vehicle (3, 9);

the satellite travel section can be oriented flush by positioning the carrier vehicle (2) crosswise along its travel path;

the satellite vehicle (3, 9), which comprises at least one self-activated powered motor providing movement, receives power in a contactless manner from a primary circuit laid along the satellite travel paths (7, 8); and at least one satellite vehicle (3, 9) and the carrier vehicle (2) include processing capabilities and transmitters for the wireless transmission of information between themselves and/or to a central unit which enable the satellite vehicle (3,9) and the carrier vehicle to move in a flexible manner directed by a transporting program, characterized in that at least two travel paths are provided for the carrier vehicle in two superimposed planes with corresponding crosswise satellite travel paths, and an elevator is provided at least at one end of the travel paths, and characterized in that at least one satellite vehicle is designed for receiving, transporting and unloading pallets, and also characterized in that the power is electromagnetically transmitted at a frequency from the primary circuit to the carrier vehicle (2) and to the satellite vehicles (3, 9).

6. A transportation system as claimed in claim 5, characterized in that the primary circuit is designed respectively as a long line arrangement, it is connected to the frequency source and is arranged along the travel path (1) of the carrier vehicle (2) and along the satellite travel paths (7, 8), that a ferrite transformer head (15) each is located on the carrier vehicle (2) and the satellite vehicles (3, 9), and a secondary winding encloses the ferrite core and is inductively coupled to the primary circuit.

7. A track-guided transportation system with at least one travel path of carrying and track-guiding elements, with at least one transportation vehicle that comprises at least one self-activated powered motor providing movement along the travel path, and to which power is transmitted in a contactless manner from a primary circuit laid along the travel path, wherein:

the transport vehicle is designed as a carrier vehicle (2) for at least one satellite vehicle (3, 9) for the transportation of goods, and has a satellite travel section for positioning and parking the satellite vehicle (3, 9);

the satellite travel section can be oriented flush by positioning the carrier vehicle (2) crosswise along its travel path;

the satellite vehicle (3, 9), which comprises at least one self-activated powered motor providing movement, receives power in a contactless manner from a primary circuit laid along the satellite travel paths (7, 8); and at least one satellite vehicle (3, 9) and the carrier vehicle (2) include processing capabilities and transmitters for the wireless transmission of information between themselves and/or to a central unit which enable the satellite vehicle (3,9) and the carrier vehicle to move in a flexible manner directed by a transporting program, characterized in that the power is electromagnetically transmitted at a middle frequency from the primary circuit to the carrier vehicle (2) and to the satellite vehicles (3, 9).

8. A track-guided transportation system with at least one travel path of carrying and track-guiding elements, with at least one transportation vehicle that comprises at least one self-activated powered motor providing movement along the travel path, and to which power is transmitted in a contactless manner from a primary circuit laid along the travel path, wherein:

the transport vehicle is designed as a carrier vehicle (2) for at least one satellite vehicle (3, 9) for the transportation of goods, and has a satellite travel section for positioning and parking the satellite vehicle (3, 9);

the satellite travel section can be oriented flush by positioning the carrier vehicle (2) crosswise along its travel path;

the satellite vehicle (3, 9), which comprises at least one self-activated powered motor providing movement, receives power in a contactless manner from a primary circuit laid along the satellite travel paths (7, 8); and at least one satellite vehicle (3, 9) and the carrier vehicle (2) include processing capabilities and transmitters for the wireless transmission of information between themselves and/or to a central unit which enable the satellite vehicle (3,9) and the carrier vehicle to move in a flexible manner directed by a transporting program, characterized in that the primary circuit is designed as a long line arrangement, it is connected to a frequency source and is arranged along the travel path (1) of the carrier vehicle (2) and along the satellite travel paths (7, 8), that a ferrite transformer head (15) is located on the carrier vehicle (2) and the satellite vehicles (3, 9), and a secondary winding encloses the ferrite core and is inductively coupled to the primary circuit.

* * * * *

UNITED STATES PATENT AND TRADEMARK OFFICE
CERTIFICATE OF CORRECTION

PATENT NO. : 6,213,025 B1
DATED : April 10, 2001
INVENTOR(S) : Sauerwein et al.

It is certified that error appears in the above-identified patent and that said Letters Patent is hereby corrected as shown below:

Column 1,
Line 6, please delete "therefor-" and please delete "rail" and substitute -- (rail) -- therefor.
Lines 41 and 42, please delete "of the kind described in the beginning, in that" and substitute -- where -- therefor.

Signed and Sealed this

Sixth Day of November, 2001

*Attest:*

NICHOLAS P. GODICI
*Attesting Officer*     *Acting Director of the United States Patent and Trademark Office*